(12) United States Patent
Olshanetsky et al.

(10) Patent No.: US 10,552,292 B2
(45) Date of Patent: Feb. 4, 2020

(54) SYSTEM, METHOD AND COMPUTER PRODUCT FOR MANAGEMENT OF PROOF-OF-CONCEPT SOFTWARE PILOTS, INCLUDING NEURAL NETWORK-BASED KPI PREDICTION

(71) Applicant: PROOV SYSTEMS LTD., Herzliya (IL)

(72) Inventors: Toby Olshanetsky, Herzliya (IL); Alexey Sapozhnikov, Ramat Gan (IL); Israel Ben Tal, Petah Tikva (IL)

(73) Assignee: PROOV SYSTEMS LTD., Herzliya (IL)

( * ) Notice: Subject to any disclaimer, the term of this patent is extended or adjusted under 35 U.S.C. 154(b) by 322 days.

(21) Appl. No.: 15/586,575

(22) Filed: May 4, 2017

(65) Prior Publication Data
US 2018/0053134 A1    Feb. 22, 2018

Related U.S. Application Data

(60) Provisional application No. 62/376,720, filed on Aug. 18, 2016.

(51) Int. Cl.
*G06Q 10/06* (2012.01)
*G06N 3/02* (2006.01)
(Continued)

(52) U.S. Cl.
CPC ............ *G06F 11/3457* (2013.01); *G06F 8/00* (2013.01); *G06F 8/60* (2013.01); *G06F 11/302* (2013.01);
(Continued)

(58) Field of Classification Search
None
See application file for complete search history.

(56) References Cited

U.S. PATENT DOCUMENTS

| 5,644,694 A | 7/1997 | Appleton |
| 5,729,669 A | 3/1998 | Appleton |

(Continued)

FOREIGN PATENT DOCUMENTS

WO    2008/134453    11/2008

OTHER PUBLICATIONS

Scott Hendrickson, "Serverless computation with openLannbda", Jun. 2016, HotCloud'16 Proceedings USENIX Congerence, p. 33-39. (Year: 2016).*

(Continued)

*Primary Examiner* — Francisco J Aponte
*Assistant Examiner* — Mark A Gooray
(74) *Attorney, Agent, or Firm* — Browdy and Neimark, PLLC

(57) ABSTRACT

A computerized computer software pilot evaluation method for quantifying performance of a first population of start-up end-users, each start-up end-user contending within at least one software pilot defined by, including performing a software task for, an enterprise end-user from among a second population of enterprise end-users, the method comprising: generating at least one neural network model, using a processor, for at least one startup server participating in at least one enterprise's pilot (aka computer software pilot), the computer software pilot comprising a task to be performed by each of at least one startup server participating in the pilot, and using the at least one neural network model to predict at least one derivable kpi from measurable kpi's generated by the startup server within the enterprise's pilot.

19 Claims, 2 Drawing Sheets

---

110. For each pilot, define specific measurable kpi's e.g. as described herein
↓
120. Generate test environment for each pilot, to be used by all start-ups taking part in this specific pilot e.g. as described herein
↓
130. Aggregate kpi data and send aggregated data to central data aggregator e.g. as described herein
↓
140. Prepare sets of training data and sets of test data e.g. as described herein
↓
150. Define suitable set of neural network definition parameters e.g. as described herein
↓
160. Use machine learning engine to generate, typically periodically, a neural network which fits the current training set stored above e.g. as described herein
↓
180. If the machine learning engine succeeds in generating a neural network model, the neural network model is stored and is used to provide data to a "simulator" which allows an enterprise cto end-user, associated with a pilot, to manipulate the pilot's kpi-x values e.g. on a screen, and to be presented, responsively, typically in real time, with the predicted kpi-y value e.g. as described herein

(51) Int. Cl.
*G06F 11/30* (2006.01)
*G06F 11/36* (2006.01)
*G06F 8/60* (2018.01)
*G06F 11/34* (2006.01)
*G06F 8/00* (2018.01)
*G06N 3/08* (2006.01)

(52) U.S. Cl.
CPC ...... *G06F 11/3664* (2013.01); *G06F 11/3668* (2013.01); *G06F 11/3672* (2013.01); *G06N 3/02* (2013.01); *G06N 3/084* (2013.01); *G06Q 10/06393* (2013.01); *G06F 11/3428* (2013.01)

(56) References Cited

U.S. PATENT DOCUMENTS

| | | | |
|---|---|---|---|
| 7,509,626 B1* | 3/2009 | Barnes | G06Q 10/06395 717/101 |
| 7,620,933 B1 | 11/2009 | Appleton | |
| 7,996,204 B2* | 8/2011 | Oslake | G06F 11/3414 703/13 |
| 8,694,953 B2 | 4/2014 | Khodabandehloo et al. | |
| 8,954,309 B2* | 2/2015 | B'Far | G06F 11/302 703/13 |
| 9,329,915 B1 | 5/2016 | Chandrasekharapuram et al. | |
| 2004/0111428 A1 | 6/2004 | Rajan et al. | |
| 2008/0134281 A1 | 6/2008 | Shinde et al. | |
| 2012/0266135 A1* | 10/2012 | Mansour | G06F 11/3648 717/124 |
| 2014/0365198 A1 | 12/2014 | Kuell et al. | |
| 2017/0139816 A1 | 5/2017 | Sapozhnikov et al. | |
| 2017/0290024 A1* | 10/2017 | Ouyang | H04W 72/085 |

OTHER PUBLICATIONS

Application Layer Intrustion Detection, Sep. 7, 2015, pp. 1-2.
Apache Commons Math, Oct. 29, 2015, p. 1-21.
Apache Drill, Oct. 23, 2015, pp. 1-2.
Aug. 10, 2015, pp. 1-4.
Apache Flink, Oct. 15, 2015, pp. 1-3.
Map Reduce, Oct. 25, 2015, pp. 1-6.

* cited by examiner

Fig. 1

10: generate at least one neural network, using a processor, for at least one startup server participating in at least one enterprise's computer software pilot, the computer software pilot comprising a task to be performed by each of at least one startup server participating in pilot

20: use the at least one neural network to predict at least one derivable kpi from measurable kpi's generated by the startup server within the enterprise's pilot

FIG. 2

110. For each pilot, define specific measurable kpi's e.g. as described herein

120. Generate test environment for each pilot, to be used by all start-ups taking part in this specific pilot e.g. as described herein 130. Aggregate kpi data and send aggregated data to central data aggregator e.g. as described herein 140. Prepare sets of training data and sets of test data e.g. as described herein 150. Define suitable set of neural network definition parameters e.g. as described herein 160. Use machine learning engine to generate, typically periodically, a neural network which fits the current training set stored above e.g. as described herein 180. If the machine learning engine succeeds in generating a neural network model, the neural network model is stored and is used to provide data to a "simulator" which allows an enterprise cto end-user, associated with a pilot, to manipulate the pilot's kpi-x values e.g. on a screen, and to be presented, responsively, typically in real time, with the predicted kpi-y value e.g. as described herein

SYSTEM, METHOD AND COMPUTER PRODUCT FOR MANAGEMENT OF PROOF-OF-CONCEPT SOFTWARE PILOTS, INCLUDING NEURAL NETWORK-BASED KPI PREDICTION

REFERENCE TO CO-PENDING APPLICATIONS

Priority is claimed from U.S. Provisional Patent Application No. 62/376,720 entitled "Computerized System For Facilitating Management of Proof-Of-Concept Software Pilots, Which May be Based on Neural Networks" and filed Aug. 18, 2016, the disclosure of which is hereby incorporated by reference.

This application is also a CIP of U.S. patent application Ser. No. 15/347,191 filed Sep. 11, 2016 and entitled "Computerized System and Method for Controlling Start-Up/Enterprise Interactions".

FIELD OF THIS DISCLOSURE

The present invention relates generally to computerized systems and more particularly to use of computerized systems to perform pilots.

BACKGROUND FOR THIS DISCLOSURE

Wikipedia describes that Apache Flink is a community-driven framework for distributed big data analytics, like Hadoop and Spark. The core of Apache Flink is a distributed streaming dataflow engine written in Java and Scala. Flink aims to bridge the gap between mapreduce-like systems and shared-nothing parallel database systems by executing arbitrary dataflow programs in a data-parallel and pipelined manner. Flink's pipelined runtime system enables execution of bulk/batch and stream processing programs.

Wikipedia describes that mapreduce is a framework for processing parallelizable problems across large datasets using a large number of computers (nodes), collectively referred to as a cluster (if all nodes are on the same local network and use similar hardware) or as a grid (if the nodes are shared across geographically and administratively distributed systems, and use more heterogenous hardware). Processing can occur on data stored either in a filesystem (unstructured) or in a database (structured). Mapreduce can take advantage of data locality by processing data near where the data is stored to reduce the distance over which data must be transmitted. In mapreduce, in an initial "Map" step, each worker node applies the "map( )" function to the local data, and writes the output to a temporary storage. A master node ensures that only one copy of redundant input data is processed. In an interim "Shuffle" step, worker nodes redistribute data based on the output keys (produced by the "map( )" function), such that all data belonging to one key is located on the same worker node. In a final "Reduce" step worker nodes process each group of output data, per key, in parallel.

Wikipedia describes that mapreduce supports distributed processing of map and reduction operations. If each mapping operation is independent of others, all maps can be performed in parallel, limited by the number of independent data sources and/or number of cpus near each source. Also, a set of 'reducers' can perform reduction, provided all outputs of the map operation that share the same key are presented to the same reducer at the same time, or providing that the reduction function is associative. Mapreduce can be applied to significantly larger datasets than "commodity" servers can handle; a large server farm using mapreduce can sort a petabyte of data in only a few hours. The parallelism is also advantageous because if one mapper or reducer fails, the work can be rescheduled if the input data is still available.

Wikipedia describes that mapreduce may include a 5-step parallel and distributed computation which may run in sequence or the steps may be interleaved:

Prepare the Map( ) input—the "mapreduce system" designates Map processors, assigns the input key value K1 that each processor would work on, and provides that processor with all the input data associated with that key value.

Run the user-provided Map( ) code—Map( ) is run exactly once for each K1 key value, generating output organized by key values K2.

"Shuffle" the Map output to the Reduce processors—the mapreduce system designates Reduce processors, assigns the K2 key value each processor should work on, and provides that processor with all the Map-generated data associated with that key value.

Run the user-provided Reduce( ) code—Reduce( ) is run exactly once for each K2 key value produced by the Map step.

Produce the final output—the mapreduce system collects all the Reduce output, and sorts it by K2 to produce the final outcome.

H2O is a big-data analytics platform which "allows users to fit thousands of potential models as part of discovering patterns in data" according to Wikipedia, by providing users with tools for big-data analysis. The H2O software provides data structures and methods suitable for big data which may be used for exploring and analyzing big datasets held, say, in cloud computing systems and in the Apache Hadoop Distributed File System as well as in conventional operating-systems e.g. Linux, macOS, and Microsoft Windows. H2O allows users to analyze and visualize whole sets of data and provides statistical algorithms such as K-means clustering, generalized linear models, distributed random forests, gradient boosting machines, naive bayes, principal component analysis, and generalized low rank models, any or all of which may be used herein. According to Wikipedia, "H2O uses iterative methods that provide quick answers using all of the client's data. When a client cannot wait for an optimal solution, the client can interrupt the computations and use an approximate solution". In deep learning, rather than throwing away most of the total data, H2O divides the total data into subsets and then analyzes each subset simultaneously using a single method. These processes are suitably combined to estimate parameters e.g. using a parallel stochastic gradient method such as the Hogwild scheme.

Stackoverflow.com teaches that "there are a number of different parameters that must be decided upon when designing a neural network. Among these parameters are the number of layers, the number of neurons per layer, the number of training iterations, etcetera. Some of the more important parameters in terms of training and network capacity are the number of hidden neurons, the learning rate and the momentum parameter."

The disclosures of all publications and patent documents mentioned in the specification, and of the publications and patent documents cited therein directly or indirectly, are hereby incorporated by reference.

SUMMARY OF CERTAIN EMBODIMENTS

Certain embodiments seek to provide a computerized system for serving a first population of start-up end-users and a second population of enterprise end-users including generating a neural network for at least one startup and at least one enterprise's pilot and using the neural network to predict at least one derivable kpi from measurable kpi's generated by that startup within that enterprise's pilot.

Certain embodiments seek to provide a computerized method for quantifying performance of start-ups within pilots, including all or any subset of the following operations, suitably ordered e.g. as follows:

For each pilot, define specific measurable kpi's;
Generate test environment for each pilot, to be used by all start-ups taking part in this specific pilot;
Aggregate kpi data and send aggregated data to central data aggregator;
Prepare sets of training data and sets of test data;
Define suitable set of neural network definition parameters;
Use a machine learning engine to generate, typically periodically, a neural network which fits the current training set stored above;
If the machine learning engine succeeds in generating a neural network, the neural network is stored and is used to provide data to a "simulator" which allows an enterprise cto end-user, associated with a pilot, to manipulate the pilot's kpi-x values e.g. on a screen, and to be presented, responsively, typically in real time, with the predicted kpi-y value.

Certain embodiments seek to provide a method and system for making predictions startup system behavior in the context of a specific pilot characterized by its own specific hardware/servers/applications/configuration.

According to certain embodiments, the system shown and described herein may connect to at least one enterprise's dedicated testing environment and access relevant databases, APIs, RFPs and additional information relevant to running a PoC (proof of concept) e.g. pilot.

According to certain embodiments, start-ups (typically as approved by an enterprise and/or by the system) may be granted secure access to:
a. a PoC (e.g. pilot) testing environment e.g. the testing environments described herein or any testing environment known in the art, and/or
b. any or all of: remote connection to the server (e.g. Linux, Windows), APIs, data connection, Containers, Big Data Stream, Kubernetes, Thrift, HTTP2, TCP/IP, etc.

According to certain embodiments, each Enterprise monitors each of its PoCs' progress in runtime and typically can compare different solutions (aka start-ups) in terms of any suitable business and/or technical KPI that may have been defined for that PoC e.g. pilot.

The following embodiments are thus provided:

Embodiment 1

A computerized system for computerized computer software pilot evaluation, the system comprising: a processor configured for generating at least one neural network, for at least one startup server participating in at least one enterprise's computer software pilot, the computer software pilot comprising a task to be performed by each of at least one startup servers participating in the pilot, and for using the at least one neural network to predict at least one derivable kpi from measurable kpi's generated by the startup server within the enterprise's pilot.

Embodiment 2

A computerized computer software pilot evaluation method for quantifying performance of a first population of start-up end-users, each start-up end-user contending within a software pilot defined by, including performing a software task for, a second population of enterprise end-users, the method comprising: generating at least one neural network, using a processor, for at least one startup server participating in at least one enterprise's computer software pilot, the computer software pilot comprising a task to be performed by each of at least one startup server participating in the pilot, and using the at least one neural network to predict at least one derivable kpi from measurable kpi's generated by the startup server within the enterprise's pilot.

Embodiment 3

A method according to certain embodiments and the generating also comprising generating a test environment for at least one individual computer software pilot, to be used by all start-ups taking part in the individual pilot.

Embodiment 4

A method according to certain embodiments wherein the generating comprises defining a set of n measurable kpi's for each individual pilot from among at least one enterprise's computer software pilots, monitoring each of at least one startup server participating in the individual pilot including measuring values for each of the measurable kpi's as generated by the at least one startup server and aggregating the values for each startup server and each pilot.

Embodiment 5

A method according to certain embodiments and also comprising selecting, for each startup server and for each pilot, from the values as aggregated for each startup server and for each pilot, a set of training data and a set of test data and storing the sets of training and test data, for each startup server and for each pilot.

Embodiment 6

A method according to certain embodiments and also comprising defining a set of neural network definition parameters, and, accordingly, using a machine learning engine to generate, if possible, at least one neural network which fits each currently stored training set for each startup server and for each pilot.

Embodiment 7

A method according to certain embodiments wherein an attempt to generate a neural network is made periodically for each startup server and for each pilot.

Embodiment 8

A method according to certain embodiments wherein each time the machine learning engine succeeds in generating a neural network for a pilot, the neural network generated is stored and is used to provide data to a simulator which supports manipulation of the pilot's kpi-x values by a human enterprise cto end-user associated with a pilot and which, responsive to the manipulation, presents the end-user with at least one kpi-y value predicted by the neural network for at least one startup server.

Embodiment 9

A method according to certain embodiments wherein the simulator, responsive to the manipulation, displays the at least one kpi-y value predicted by the neural network for at least one startup server, on a computer screen in real time.

Embodiment 10

A method according to certain embodiments wherein the neural network is operative for predicting, as a function of a set of n_s independent measurable kpi's which characterize each individual startup server s from among at least one startup server participating in the individual pilot, at least one dependent kpi, kpi-y, characterizing the individual startup server.

Embodiment 11

A method according to certain embodiments wherein the generating comprises: assigning values to neural network definition parameters (aka neural network element attributes); and saving the values for certain of the neural network definition parameters for re-use.

Embodiment 12

A method according to certain embodiments wherein the set of n_s independent kpi's comprises exactly 2 independent kpi's, for at least some startup servers.

Embodiment 13

A method according to certain embodiments wherein the measurable kpi's comprise at least one technical kpi including at least one of: an operating system KPI, and a KPI relevant to a specific channel type.

Embodiment 14

A method according to certain embodiments wherein n_s=n, a single value which is uniform over plural startup servers s and wherein at least some neural network definition parameters are computed once and re-used each time at least one neural network is used to predict at least one derivable kpi from measurable kpi's generated by the plural startup servers.

Embodiment 15

A method according to certain embodiments wherein for at least one startup server participating in at least one enterprise's computer software pilot, at least one dependent kpi comprises a parameter quantifying disc usage by the server, and the measurable kpi's comprise a first kpi comprising % cpu utilization by the server and a second kpi comprising a parameter quantifying memory usage by the server.

Embodiment 16

A method according to certain embodiments wherein n_s=n, a single value which is uniform over all servers s and at least one pilot and wherein at least some neural network definition parameters are computed once and re-used each time at least one neural network is used to predict at least one derivable kpi from measurable kpi's generated by all startup servers within at least one enterprise's pilot.

Embodiment 17

A method according to certain embodiments wherein a training set is defined for all startups and pilots thereby to define plural training sets and wherein data in each of the plural training sets is accumulated by sampling over a period of length H hours where H is uniform for all startups and pilots.

Embodiment 18

A method according to certain embodiments wherein n_s=2, over all servers s and at least one pilot.

Embodiment 19

A method according to certain embodiments wherein the at least one pilot comprises all pilots.

Embodiment 20

A computer program product, comprising a non-transitory tangible computer readable medium having computer readable program code embodied therein, the computer readable program code adapted to be executed to implement a computerized computer software pilot evaluation method for quantifying performance of a first population of start-up end-users, each start-up end-user contending within a software pilot defined by, including performing a software task for, a second population of enterprise end-users, the method comprising:
generating at least one neural network, using a processor, for at least one startup server participating in at least one enterprise's computer software pilot, the computer software pilot comprising a task to be performed by each of at least one startup server participating in the pilot, and
using the at least one neural network to predict at least one derivable kpi from measurable kpi's generated by the startup server within the enterprise's pilot.

Embodiment 21

A system according to certain embodiments wherein, once a neural network model has been generated for a given start-up and/or pilot and/or enterprise, the model is packaged in a serverless container and subsequently, KPI prediction computation for the given start-up and/or pilot and/or enterprise, is in accordance with the serverless container-packaged model and wherein each time the model is updated, regenerated or recreated, the updated/regenerated/recreated model is repackaged and redeployed into the container.

The following terms may be construed either in accordance with any definition thereof appearing in the prior art literature or in accordance with the specification, or to include in their respective scopes, the following:

Library aka engine—e.g. H2O or other alternative engine which may comprise a library for installation on a server or cluster of servers. H2O is merely an example, used herein for clarity, of an engine that may be employed, say, for running neural nets. Alternatively, any other conventional e.g. open source or custom-developed machine learning libraries/framework may be employed such as but not limited to Apache Spark MLlib, DeepLearning4j, TensorFlow.

Test Environment: intended to include a software environment typically used by all start-ups taking part in an individual pilot. May include web API/s running on an application server, with or without an associated database. Or, may include plural servers running web APIs and a database.

Pilot environment: Used herein as opposed to a final enterprise-startup integration environment aka final-configuration. For example, a pilot for given software might be run on a single server, whereas the final configuration on which the given software will run in the field, will include plural servers.

Neural network complexity: intended to include any suitable metric known in the art may be employed, such as but not limited to number of neurons and/or of synapses, or any suitable metric that quantifies complexity of the network structure or the amount of work needed to learn a certain thing, or how many neurons are needed to approximate a certain function. Includes neural complexity which may be expressed as lower bounds for numbers of neurons a network needs to perform a given task within a given tolerance and/or information complexity which may be expressed as lower bounds for information needed about a given input-output function e.g. number of examples of the function required.

% cpu=cpu utilization—intended to include the proportion of total cpu capacity that is being used at a given time (sampling time)

Model: intended to include measured kpi or kpi's which predict another 1 or more kpi's. For example: 2 measured kpi's may be used to predict a $3^{rd}$ kpi in which case each such triplet constitutes a separate model. If for example, a particular disc usage parameter y is being predicted by 2 measured kpi's including a cpu utilization parameter and a memory utilization parameter, this is one model, whereas if, say, a different disc usage parameter y is being predicted by 2 measured kpi's including the same or a different cpu utilization parameter and the same or a different a memory utilization parameter, this is another model. If, say, the same or a different disc usage parameter y is being predicted by 2 measured kpi's including a different cpu utilization parameter and the same or a different a memory utilization parameter, this is yet another model.

Each pilot may include thousands of models. For example, if a pilot has 20 participating startups, each startup running on a server or more (e.g. perhaps startup1 has 2 servers whereas startup2 has 5 servers), and if 80-85 kpi's are being per server and per startup, this adds up to 80×20=1600 models for a single pilot.

Example triplets (although the embodiments shown and described herein may be operative without using any of the following triplets or any of the kpi's included therewithin):

Measured kpi's are: Used CPU By Process, Used Memory By Process RDC.

$3^{rd}$ kpi being predicted thereby: Free DiskSpace RDC

Measured kpi's are: Used CPU By Process, Used Memory By Process $3^{rd}$ kpi being predicted thereby: Free DiskSpace ssh Measured kpi's are: Used CPU By Process, Free DiskSpace ssh $3^{rd}$ kpi being predicted thereby: Used Memory By Process.

In kpi names, typically, a process is intended to include instance of a computer program that is being executed, typically including program code and its current activity.

Also, kpi names such as "used memory by process", used cpu by process" refer respectively to % memory or % cpu that are used, by a particular process.

Predictive analytics: typically pertain to predictions within the pilot environment, not for the final environment. Therefore, the predictions generated may be applicable to the final environment, but only to the extent that the pilot environment is similar to the final enterprise-startup integration environment.

Key Performance Indicator (KPI): intended to include any measurable value or value derivable from measurable values, that characterizes a start-up's software system's functioning when the start-up software system handles a task set for it by an enterprise running a pilot. KPI's may for example include SOAP (Simple Object Access Protocol)-specific KPI's, REST (Representational State Transfer)-specific KPIs, database (db) KPI's e.g. as defined conventionally by RDBMS vendors, etc.

It is appreciated that the particular kpi's mentioned herewithin are merely by way of example. For example, it is perfectly possible to implement the embodiments shown and described herein without using even one of the example kpi's which happen to be mentioned herewithin.

Eeoch: intended to include:

a. During iterative training of a neural network, a single pass through the entire training set which may be followed by testing of the verification set, and/or b. one full training cycle on a training set in which every sample in the training set is handled once. Looping back to handling each sample again indicates the starting point of the next epoch, and/or c. one forward pass and one backward pass over all training examples Business kni aka high-level kni: intended to include any kpi pertaining to Business Logic of a computerized enterprise's software systems, where business logic is intended to include any or all of: logic which controls how data is transformed, logic which controls how data is computed, logic which controls how data is routed to people, and logic which controls how data is routed between software entities. For example, business KPIs may be selected to be indicative of risks that a computerized enterprise may run when a computerized startup system is integrated in the enterprise's computerized system.

Technical koi aka low-level kni: intended to include any KPI indicative of possible technical (e.g. hardware or software) problems that may arise in integrating a computerized startup system with a computerized enterprise system.

Any suitable conventional virtual machine or server e.g. in conventional cloud services may be used to measure kpi-x values, typically according to control signals received from an agent in the system shown and described herein. A remote KPI taker may ask a target server for certain kpi-x values e.g. via a suitable API.

For some or all pilots, servers with preinstalled KPI agents that collect metrics e.g. technical KPI values, may be bootstrapped.

IRO (interrupt reauest)s: intended to include a hardware line over which devices can send interrupt signals to a microprocessor.

Ssh (Secure Shell) an example of a cryptographic (e.g. public key) network protocol which may be used to provide a secure channel over an unsecured network in a client-server architecture, including connecting an SSH client application with an SSH server. SSH protocol versions include SSH-1 and SSH-2. When used as part of a kpi's name, "ssh" indicates a kpi which is pertinent to an SSH-type channel.

rdc: Remote Desktop Connection. When used as part of a kpi's name, "rdc" indicates a kpi which is pertinent to an RDC-type channel.

Channel: intended to include any virtual channel application channels, and may for example include SSH channels and/or RDC channels. Each channel typically includes a. a server module which typically includes an executable program which may for example run on a Remote Desktop Session Host (RD Session Host) server; and b. a client module typically including a DLL loaded into memory on a client computer when a suitable client program, e.g. an RDC client program, runs.

RDBMS: intended to include any relational database management system

Also provided, excluding signals, is a computer program comprising computer program code means for performing any of the methods shown and described herein when the program is run on at least one computer, and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIG. 1 is a simplified general flowchart illustration of a computerized method for quantifying performance of start-ups within pilots, in accordance with certain embodiments.

FIG. 2 is a detailed flowchart illustration of a computerized method for quantifying performance of start-ups within pilots, in accordance with certain embodiments.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS OF THE INVENTION

A computerized system is provided for supporting decision making by an enterprise end-user which has defined a pilot with the goal of comparing several (say 3 or 5 or 10) startups (software programs) each able to perform a task for which the pilot is defined. For example, the task may be to monitor certain aspects of the performance of some startup system module against an enterprise system. The comparing may be desired to support a decision on who to buy software from or who to partner with. The system monitors each startup's performance (monitors plural kpi's representing the startup's performance) within a test environment generated for the pilot, once the startup's software has been detected in the test environment. Typically, the test environments for many pilots all coexist in the system shown and described herein, which may be on a cloud. Typically, a "virtual marketplace" is defined allowing enterprise end-users to provide pilots and allowing startup end-users to apply to participate in such pilots, typically after a human expert vets the startup applicant to determine that the startup's software is indeed capable of performing the task for which the pilot is defined. The task may be a software task or may be a task performed by a "smart box" having both hardware and software components. Typically, the smart box's software's performance may be monitored and compared to the performance of other startups' software programs running within the same test environment, e.g. as shown and described herein.

FIG. 1 is a simplified general flowchart illustration of a computerized method for quantifying performance of start-ups within pilots, in accordance with certain embodiments.

FIG. 2 is a detailed flowchart illustration of a computerized method for quantifying performance of start-ups within pilots, in accordance with certain embodiments.

A computerized method which uses neural networks to generate predictions may include any or all of the following operations, suitably ordered e.g. as follows. The operations below may each be used standalone or may be used to implement the methods of FIG. 1 and/or FIG. 2. The method may be used in conjunction with a computerized platform for enterprise end-users each of which has defined at least one pilot, each pilot having the goal of comparing several (say 3 or 5 or 10) startups (software programs) each able to perform a task for which the pilot is defined. Turning now to the operations themselves:

Operation i. For each pilot, define specific measurable kpi's aka x-kpi's, and derivable kpi's (from the x-kpia's) aka y-kpi's. Typically, each pilot's kpi's are defined by selection from a "pool" of kpi's which may include hundreds of kpi's e.g. 200, 500, 800 or any other suitable number of kpi's. The pool of kpi's may for example include, say, the % of memory used by the startup software program in the test environment, at a given time t, or the % of cpu power used by the startup, at a given time t. Typically, kpi's defined include operating system-specific kpi's and/or data base-specific kpi's and/or API-specific kpi's and/or business kpi's. Typically, the pool of kpi's includes groups of kpi's, such as some or all of:

(a) specific kpi's for each operating system (aka operating system level KPIs). It is appreciated that KPI's may be considered operating system level KPIs if measured by a software agent of the system shown and described herein, by calling relevant operating system APIs.

So, for example, a pilot using Windows may select some or all of the Windows kpi's such as but not limited to:

Cpu Idle Rdc
Cpu Info List Cache Size Rdc
Cpu Info List Cores Per Socket
Cpu Info List Length Rdc
Cpu Info List Mhz Rdc
Cpu Info List Total Cores Rdc
Cpu Info List Total Sockets Rd
Cpu Irq Rdc
Cpu Nice Rdc
Cpu Perc Combined Rdc
Cpu Perc Idle Rdc
Cpu Perc Irq Rdc
Cpu Perc Nice Rdc
Cpu Perc Soft Irq Rdc
Cpu Perc Stolen Rdc
Cpu Perc Sys Rdc
Cpu Perc Wait Rdc
cpu utilization kpi's such as but not limited to:
CPU RDC; Cpu Soft Irq Rdc; Cpu Stolen Rdc; Cpu Sys Rdc; Cpu Total Rdc; Cpu User Rdc; and Cpu Wait Rdc.
Disk Usage Queue Rdc
Disk Usage Read Bytes Rdc
Disk Usage Reads Rdc
Disk Usage Service Time Rdc
Disk Usage Write Bytes Rdc
Disk Usage Writes Rdc
File System Usage Disk Queue R
File System Usage Disk Read By
File System Usage Disk Reads R
File System Usage Disk Service
File System Usage Disk Write B
File System Usage Disk Writes
File System Usage Files Rdc
File System Usage Free Rdc
File System Usage Percent
File System Usage Total Rdc
File System Usage Used Rdc
Free DiskSpace RDC
Free Memory RDC
memory utilization kpi's such as but not limited to Mem Actual Free Rdc; Mem Actual Used Rdc; Mem Free Percent Rdc; Mem Ram Rdc; Mem Total Rdc; Mem Used Percent Rdc; Mem Used Rdc, Net Stat All Inbound Total Rdc.
Net Stat All Outbound Total Rd
Net Stat Tcp Inbound Total Rdc
Net Stat Tcp Outbound Total Rd
Proc Stat Idle Rdc
Proc Stat Running Rdc
Proc Stat Sleeping Rdc
Proc Stat Stopped Rdc
Proc Stat Threads Rdc
Proc Stat Total Rdc
Proc Stat Zombie Rdc
Resource Limit Core Cur Rdc
Resource Limit Core Max Rdc
Resource Limit Open Files Cur
Resource Limit Open Files Max
Swap Free Rdc
Swap Page In Rdc
Swap Page Out Rdc
Swap Total Rdc
Swap Used Rdc
Tcp Active Opens Rdc
Tcp Attempt Fails Rdc
Tcp Curr Estab Rdc
Tcp Estab Resets Rdc
Tcp In Errs Rdc
Tcp In Segs Rdc
Tcp Out Rsts Rdc
Tcp Out Segs Rdc
Tcp Passive Opens Rdc
Tcp Retrans Segs Rdc
Thread Cpu Sys Rdc
Thread Cpu Total Rdc
Thread Cpu User Rdc
Used CPU By Process (or any other cpu utilization kpi)
whereas a pilot using a Linux version/distro may select some or all of the Linux kpi's or some or all of the kpi's defined for the specific version/distro being employed such as cpu (or any other cpu utilization kpi)
Cpu Idle Ssh
Cpu Info List Cache Size Ssh
Cpu Info List Cores Per Socket
Cpu Info List Length Ssh
Cpu Info List Mhz Ssh
Cpu Info List Total Cores Ssh
Cpu Info List Total Sockets Ss
Cpu Irq Ssh
Cpu Nice Ssh
Cpu Perc Combined Ssh
Cpu Perc Idle Ssh
Cpu Perc Irq Ssh
Cpu Perc Nice Ssh
Cpu Perc Soft Irq Ssh
Cpu Perc Stolen Ssh
Cpu Perc Sys Ssh
Cpu Perc Wait Ssh
cpu utilization kpi's such as but not limited to:
Cpu Soft Irq Ssh, Cpu Stolen Ssh, Cpu Sys Ssh, Cpu Total Ssh, Cpu User Ssh, Cpu Wait Ssh, Used Cpu By Process.
Disk Usage Queue Ssh
Disk Usage Read Bytes Ssh
Disk Usage Reads Ssh
Disk Usage Service Time Ssh
Disk Usage Write Bytes Ssh
Disk Usage Writes Ssh
File System Usage Disk Queue S
File System Usage Disk Read By
File System Usage Disk Reads S
File System Usage Disk Service
File System Usage Disk Write B
File System Usage Disk Writes
File System Usage Files Ssh
File System Usage Free Ssh
File System Usage Percent
File System Usage Total Ssh
File System Usage Used Ssh
Free Disk Space memory utilization kpi's such as but not limited to Free Memory; Mem Actual Free Ssh; Mem Actual Used Ssh; Mem Free Percent Ssh; Mem Ram Ssh; Mem Total Ssh; Mem Used Percent Ssh; Mem Used Ssh; Used Memory By Process.
Net Stat All Inbound Total Ssh
Net Stat All Outbound Total Ss
Net Stat Tcp Inbound Total Ssh
Net Stat Tcp Outbound Total Ss
Proc Stat Idle Ssh
Proc Stat Running Ssh
Proc Stat Sleeping Ssh
Proc Stat Stopped Ssh
Proc Stat Threads Ssh
Proc Stat Total Ssh
Proc Stat Zombie Ssh
Resource Limit Core Cur Ssh
Resource Limit Core Max Ssh
Resource Limit Open Files Cur
Resource Limit Open Files Max
Swap Free Ssh
Swap Page In Ssh
Swap Page Out Ssh
Swap Total Ssh
Swap Used Ssh
Tcp Active Opens Ssh
Tcp Attempt Fails Ssh
Tcp Curr Estab Ssh
Tcp Estab Resets Ssh
Tcp In Errs Ssh
Tcp In Segs Ssh
Tcp Out Rsts Ssh
Tcp Out Segs Ssh
Tcp Passive Opens Ssh
Tcp Retrans Segs Ssh
Thread Cpu Sys Ssh
Thread Cpu Total Ssh
Thread Cpu User Ssh
and/or
(b) API kpi's—if the pilot uses an API—such as
API URL Response Time
API Base URL Response Size
API Base URL Response Time
API Query Length KPI
API Total Time KPI
API URL Response Time.

The above may for example be provided by the relevant operating system.

(c) database kpi's—if the pilot uses a database—such as the following example database kpi's or any other kpi known in the art of RDBMS or more generally the art of computerized databases.

DB Inserts
DB Number Of Processes
DB Reads
DB Response Time
DB Selects
DB Total Memory Used (and/or any other memory utilization kpi)
DB Kilobytes Received
DB Kilobytes Sent
DB Created Temporary Disk Tables
DB Created Temporary Files
DB Created Temporary Tables
DB Opened Table Definitions
DB Opened Tables
DB Opened Files
DB Statements Executed
DB Key Reads
DB Key Writes
DB Table Locks Immediate
DB Table Locks Waited
DB Threads Cached
DB Threads Connected
DB Threads Created
DB Threads Running
DB Up Time
DB Transactions that use disk
DB Transactions that use cache
DB Joins that perform table scans
DB Joins that check for key usage
DB Joins that perform full scan
DB Slow Queries
DB Max Used Connections
DB Free Memory in Query Cache
DB Queries Registered in Query Cache
DB Deleted Queries from Cache
DB Opened Connections
DB Aborted Connections
DB Aborted Clients
DB Thread Cache Size
DB Slow Launch Threads
DB Sort Scan
DB Sort Rows
DB Select Scan
DB Select Full Join
DB Select Range Check The above kpi's enable prediction not only technical kpi's but also business kpi's such as:

Startup system resources over- or under-utilization
Startup system availability
Startup system reliability
Startup system possible downtimes
Business continuity (startup system disaster recovery)
Startup system fault tolerance
Startup system latency
Startup system quality of service
Risk of business flow/task failure
Percentage of business processes where completion falls within +/−5% of the estimated completion
Average business process overdue time
Percentage of overdue business processes
Average business process age
Percentage of business processes where the actual number assigned resources is less than planned number of assigned resources
Sum of costs of "killed"/stopped active business processes
Average time to complete business flow/task
Sum of deviation of time (e.g. in hours or days) against planned schedule of all active business processes
Total business flow/task duration
Risk of data loss Operation ii. Generate test environment for each pilot, to be used by all start-ups taking part in this specific pilot, which is normally associated with a single enterprise. A suitable method for generating a test environment for each pilot, to be used by all start-ups taking part in this specific pilot, is described in Applicant's co-pending patent application, appended herewith as Appendix A.

Operation iiia. Aggregate kpi data—collect kpi's (both x- and y-kpi's for neural net model generation and training, and x-kpi's only for neural net model validation and verification) from each start-up installed, hence operating within the text environment generated in operation ii, typically periodically e.g. every 5-15 minutes. This may be implemented as agentless remote kpi discovery, or by agent-based local kpi discovery, or in both of these modes, which may be user-selectable or system-selectable.

Operation iiib. optionally, send aggregated data to central data aggregator for storage in any suitable computerized data format.

Operation iv. Prepare sets of training data and sets of test data: Each set of training data may include, say, 48 hours' worth of kpi's for a specific pilot and start-up; whereas each set of test data may include, say, 24 hours' worth of kpi's for the same pilot and startup. Typically, each pilot/startup's training data set includes thousands of records, each including—say—two pki-x values and the corresponding measured pki-y value, all measured typically, at the same given time.

Of course, training data and test data typically do not overlap; typically the test data is that which immediately follows the training data, so if the training data represents the kpi's generated from Sunday 3 pm till 3 pm, the test data might represent measured y-kpi value/s generated from Tuesday 3 pm till Wednesday 3 pm. Typically, sets of training data and sets of test data are generated for each pilot and each startup operating within that pilot and for specific kpi's defined for that pilot. Typically, an engine activates a suitable s/w functionality in Apache Flink and Hadoop, to perform this operation, typically periodically e.g. once every 5 minutes. Typically, each file including training data includes records, each including a set of x-kpi's and the corresponding set of y-kpi's as measured. Each file includes test data which may include thousands or tens of thousands of records, each including a set of x-kpi's. It is appreciated that many files, such as 20 files, may be generated each period (e.g. every 5 minutes).

So, the sets of training data and sets of test data may be regarded as moving windows whose width is, say, a day or more and wherein the distance between moving window positions is, say, a few minutes or an hour.

Eventually, two files (one training set and one test set) may be generated for each set of kpi's, for each pilot, and for each start-up operating within the pilot. The s/w functionality e.g. Flink may process input data pertaining to dozens or more of kpi's, of which are generated one file pertaining, say, to kpi-x1, kpi-x2, kpi-y1 (for a pilot which is interested in kpi-x1, kpi-x2 as independent variables and in kpi-y1 for its dependent variable; then another file pertaining, say, to kpi-x3, kpi-x4, kpi-y2, etc. For a pilot which is interested in kpi-x3, kpi-x4 as independent variables and in kpi-y2 for its dependent variable, where kpi-y1, kpi-y2 here refers to the measured values of the kpi in question as opposed to values of the kpi in question which are estimated from x-kpi values. For simplicity, it is assumed that pilots are restricted to only two kpi-x's and only one kpi-y, however this is in no way limiting; any suitable number of measurable and derivable kpi's may be employed such as, say, 10 each. The s/w functionality e.g. Flink may override, each time it generates a new training set or test set, the previously generated training set or test set (for the same pilot, startup, and kpi set). Typically, the current training set and test set are each stored in distributed fault-tolerant storage, in association with the relevant pilot id, startup id and id of the relevant kpi's e.g. Kpi-x3, kpi-x48, kpi-y40 if the training set includes the 3rd and 48th kpi's in the "pool" of kpi-x's, and the 40th kpi in the "pool" of kpi-y's.

Operation v: A suitable set of neural network definition parameters is determined, which defines desired properties of the neural network to be generated in operation vi below. For example, a suitable machine learning engine e.g. H2O may be used for that purpose.

Example embodiment: some or all of the following neural-network definition parameters may be determined:
a. Number of hidden layers e.g., say, 20 hidden layers, 100 hidden layers, or any other suitable integer, typically but not necessarily between 20 and 100
b. size of hidden layers e.g. number of neurons per layer
c. characterization of an Activation function such as but not limited to tan h (Hyperbolic Tangent), relo (relocation function), sigmoid
d. Number of epochs e.g. 2 epochs, 30 epochs, or any other suitable integer, typically but not necessarily between 2 and 30.

For efficiency, according to certain optional embodiments, pre-determined values for a small number e.g. 3 or 4 or 5 or less than 10 neural network definition parameters, e.g. values for some or all of the above parameters a—d, are retained for re-use for all pilots and start-ups, or for all start-ups in a given pilot, or for all pilots run by a given enterprise, whereas additional neural network definition parameters may be computed each pilot and/or startup and/or enterprise separately.

It is appreciated that any other suitable combination of any other neural-network definition parameters may be employed (e.g. may be retained and re-used) instead, such as but not limited to any suitable combination of any of the following neural-network definition parameters:

| | |
|---|---|
| distribution enum | Distribution function |
| tweedie_power double | Tweedie Power |
| balance_classes boolean | Balance training data class counts via over/under-sampling (for imbalanced data). |
| class_sampling_factors float[ ] | Desired over/under-sampling ratios per class (in lexicographic order). If not specified, sampling factors will be automatically computed to obtain class balance during training. Requires balance_classes. |
| max_after_balance_size float | Maximum relative size of the training data after balancing class counts (can be less than 1.0). Requires balance_classes. |
| max_confusion_matrix_size int | Maximum size (# classes) for confusion matrices to be printed in the Logs |

| | |
|---|---|
| max_hit_ratio_k<br>int | Max. number (top K) of predictions to use for hit ratio computation (for multi-class only, 0 to disable) |
| overwrite_with_best_model<br>boolean | If enabled, override the final model with the best model found during training |
| autoencoder<br>boolean | Auto-Encoder |
| use_all_factor_levels<br>boolean | Use all factor levels of categorical variables. Otherwise, the first factor level is omitted (without loss of accuracy). Useful for variable importances and auto-enabled for autoencoder. |
| activation<br>enum | Activation function |
| hidden<br>int[ ] | Hidden layer sizes (e.g. 100, 100). |
| epochs<br>double | How many times the dataset should be iterated (streamed), can be fractional |
| train_samples_per_iteration<br>long | Number of training samples (globally) per MapReduce iteration. Special values are 0: one epoch, −1: all available data (e.g., replicated training data), −2: automatic |
| target_ratio_comm_to_comp<br>double | Target ratio of communication overhead to computation. Only for multi-node operation and train_samples_per_iteration = −2 (auto-tuning) |
| seed<br>long | Seed for random numbers (affects sampling) -Note: only reproducible when running single threaded |
| adaptive_rate<br>boolean | Adaptive learning rate |
| rho<br>double | Adaptive learning rate time decay factor (similarity to prior updates) |
| epsilon<br>double | Adaptive learning rate smoothing factor (to avoid divisions by zero and allow progress) |
| rate<br>double | Learning rate (higher => less stable, lower => slower convergence) |
| rate_annealing<br>double | Learning rate annealing: rate/(1 + rate annealing * samples) |
| rate_decay<br>double | Learning rate decay factor between layers (N-th layer: rate*alpha^(N-l)) |
| momentum_start<br>double | Initial momentum at the beginning of training (try 0.5) |
| momentum_ramp<br>double | Number of training samples for which momentum increases |
| momentum_stable<br>double | Final momentum after the ramp is over (try 0.99) |
| nesterov_accelerated_gradient<br>boolean | Use Nesterov accelerated gradient (recommended) |
| input_dropout_ratio<br>double | Input layer dropout ratio (can improve generalization, try 0.1 or 0.2) |
| hidden_dropout_ratios<br>double[ ] | Hidden layer dropout ratios (can improve generalization), specify one value per hidden layer, defaults to 0.5 |
| l1<br>double | L1 regularization (can add stability and improve generalization, causes many weights to become 0) |
| l2<br>double | L2 regularization (can add stability and improve generalization, causes many weights to be small) |
| max_w2<br>float | Constraint for squared sum of incoming weights per unit (e.g. for Rectifier |
| initial_weight_distribution<br>enum | Initial Weight Distribution |
| initial_weight_scale<br>double | Uniform: -value . . .value, Normal: stddev) |
| loss<br>enum | Loss function |
| score_interval<br>double | Shortest time interval (in secs) between model scoring |
| score_training_samples<br>long | Number of training set samples for scoring (0 for all) |
| score_validation_samples<br>long | Number of validation set samples for scoring (0 for all) |
| score_duty_cycle<br>double | Maximum duty cycle fraction for scoring (lower: more training, higher: more scoring). |

-continued

| | |
|---|---|
| classification_stop double | Stopping criterion for classification error fraction on training data (−1 to disable) |
| regression_stop double | Stopping criterion for regression error (MSE) on training data (−1 to disable) |
| quiet_mode boolean | Enable quiet mode for less output to standard output |
| score_validation_sampling enum | Method used to sample validation dataset for scoring |
| diagnostics boolean | Enable diagnostics for hidden layers |
| variable_importances boolean | Compute variable importance for input features (Gedeon method)-can be slow for large networks |
| fast_mode boolean | Enable fast mode (minor approximation in back-propagation) |
| force_load_balance boolean | Force extra load balancing to increase training speed for small datasets (to keep all cores busy) |
| replicate_training_data boolean | Replicate the entire training dataset onto every node for faster training on small datasets |
| single_node_mode boolean | Run on a single node for fine-tuning of model parameters |
| shuffle_training_data boolean | Enable shuffling of training data (recommended if training data is replicated and train_samples_per_iteration is close to #nodes x #rows, of if using balance_classes) |
| missing_values_handling enum | Handling of missing values. Either Skip or MeanImputation. |
| sparse boolean | Sparse data handling (Deprecated). |
| col_major boolean | Use a column major weight matrix for input layer. Can speed up forward propagation; but might slow down backpropagation (Deprecated). |
| average_activation double | Average activation for sparse auto-encoder (Experimental) |
| sparsity_beta double | Sparsity regularization (Experimental) |
| max_categorical_features int | Max. number of categorical features, enforced via hashing (Experimental) |
| reproducible boolean | Force reproducibility on small data (will be slow-only uses 1 thread) |
| export_weights_and_biases boolean | Whether to export Neural Network weights and biases to H2O Frames |
| model_id Key | Destination id for this model; auto-generated if not specified |
| training_frame Key | Training frame |
| validation_frame Key | Validation frame |
| nfolds int | Number of folds for N-fold cross-validation |
| keep_cross_validation_predictions boolean | Keep cross-validation model predictions |
| response_column VecSpecifier | Response column |
| weights_column VecSpecifier | Column with observation weights |
| offset_column VecSpecifier | Offset column |
| fold_column VecSpecifier | Column with cross-validation fold index assignment per observation |
| fold_assignment enum | Cross-validation fold assignment scheme, if fold_column is not specified |
| ignored_columns string[ ] | Ignored columns |
| ignore_const_cols boolean | Ignore constant columns |
| score_each_iteration boolean | Whether to score during each iteration of model training |
| checkpoint Key | Model checkpoint to resume training with |

Neural network definition parameters may include properties of the process used to generate the neural network e.g. the number of iterations of machine learning which are "permitted". According to one embodiment, a single generic set of neural network definition parameters is defined, for all startups participating in a specific pilot, or even for all pilots. However, this is not intended to be limiting.

Operation vi. A suitable machine learning engine is employed to generate a neural network, which fits e.g. best fits the current training set stored in operation iv above. The neural network may be generated e.g. in source code (say in Java) or alternatively accessed via some API (say REST) provided by the machine learning engine used in operation vi. This operation vi may be activated periodically e.g. once per hour. Typically, neural network definition parameters are determined once and are used repeatedly by the machine learning engine, once per hour, each time in combination with a new set of training and test data (in view of the newest position of the moving windows for training data and for test data. According to certain embodiments, the neural network generated each period (e.g. every hour) is tested e.g. on the test data, and overrides the neural network generated previously either unconditionally or, alternatively—only if the newer neural network predicts more accurately than the previous neural network (say 90% prediction accuracy of pki-y as a function of pki-x's, for the newer network, vs. 70% for the previous neural network).

Operation vii. If the machine learning engine fails to generate a neural network (e.g. due to noisy variables relative to the amount of data collected and/or due to insufficient correlation between the x and y variables, or due to insufficient computational resources (memory and/or processor of the machine learning engine), a suitable error message is generated which may for example recommend that more data be collected; for example, if the moving data window is 48 hours in width, perhaps a 72 hour wide window should be used. Failure may be determined, for example, if a neural network generated from a particular training set fails to predict the data in the test set, using a predetermined definition of failure. In the event of failure, any suitable step may be taken e.g. running another iteration of machine learning or enlarging the width of the moving window. The test set may have a fixed size or may have a dynamic size in which case a larger test set may be used in the event of failure.

Operation viii. If the machine learning engine succeeds in generating a neural network, the neural network is stored and is used to provide, typically in real-time, kpi-y data computed from user-provided kpi-x data, to a "simulator" which allows an enterprise cto end-user, associated with a pilot, to manipulate the pilot's kpi-x values and to be presented, responsively, typically in real-time, with the predicted kpi-y value. Typically, the neural network code generated in operation vii is run each time a user of the simulator slides one or both pki-x values to a new position.

Any suitable user input option may be provided to allow the enterprise cto end-user to select values for the pilot's kpi-x parameters e.g. a sliding scale for each kpi-x appearing on the workstation screen. Then kpi-x values may be selected by sliding a cursor (say) back and forth along the scale. This is particularly useful as a decision support tool. For example, an enterprise cto end-user may know that the startup software has certain peak memory requirements. Therefore, the enterprise cto end-user may be trying to decide whether to select startup a or startup b. To facilitate this decision making process, the two kpi-x values selected may be CPU Total Ssh and Disk Usage Writes Ssh and the kpi-y value selected may be Mem Free Percent Ssh. Then, if Mem Free Percent Ssh is low, the enterprise cto end-user may decide to prefer startup a, whereas if Mem Free Percent Ssh is high, the enterprise cto end-user may decide to prefer startup b.

Operation ix. Enterprise cto end-user selects one startup based on the decision support tool and integrates that startup's software with the enterprise's software.

It is appreciated that each pilot may run for any suitable, typically enterprise determined length of time. Typically, the performance (e.g. as operationalized by suitable kpi's) of start-ups participating in a pilot is measured not only at the end of the pilot but also repeatedly in the course of the pilot. Typically, each such measurement, or at least some of them (each gathering of kpi data to serve as a test set) is preceded by gathering of training set data, rather than gathering training set data only once. For example, if a pilot's duration is 3 months, a test set of kpi data may be gathered each 3 days, say for 24 hours, and each such event may be preceded by gathering of training set kpi data for, say, 48 hours. While in this example, data e.g. kpi's are continuously collected (each 3 days 48 hours' worth of training set data is accumulated followed by 24 hours' worth of test set data) this need not necessarily be the case. Typically, all startups are run simultaneously and on the same enterprise-provided database, and are sampled simultaneously, thereby to render the kpi data comparable over startups.

Example Pilots:

Startups each receive enterprise data from an enterprise and use their server to respond to a stream of queries thereupon.

Startups each receive a stream of events from an enterprise and use their server to score each event (e.g. scoring level of risk of each of a stream of credit card transactions).

It is appreciated that any suitable technology may be employed to generate a pilot environment which allows an enterprise (or simulator thereof) to interface simultaneously with several competing startups all simultaneously performing the same software tasks defined by the enterprise.

Example: for a fintech pilot, an enterprise may provide API's e.g. SOAP APIs that are deployed on an application server running in a pilot environment. Each startup system integrates with these APIs. Suitable startup system code may be developed using any suitable programming language and libraries that support the SOAP specification such as, say, Java, C#, Python, server-side Javascript (NodeJS).

It is appreciated that any suitable technology may be employed to generate (typically virtual) communication channels, which may or may not be ssh channels and may or may not be rdc channels, between enterprise, startup and the server of the system shown and described herein.

The H2O software, or alternative, may have an interface to several programming languages any of which may be employed e.g. Java 6 or later, Python 2.7.x, 3.5.x, R 3.0.0 or later Scala 2.10-2.11, can be run on conventional operating-systems any of which may be employed e.g. Microsoft Windows (7 or later), Mac OS X (10.9 or later), and Linux (Ubuntu 12.04; RHEL/CentOS 6 or later). The H2O software can also run on big-data systems any of which may be employed e.g. Apache Hadoop Distributed File System (HDFS), e.g. versions Cloudera (5.1 or later), MapR (3.0 or later), and Hortonworks (HDP 2.1 or later). The H2O software also operates on cloud computing environments any of which may be employed e.g. Amazon EC2, Google Compute Engine, and Microsoft Azure. The H2O Graphical user is compatible with various browsers any of which may be employed e.g. e.g. Chrome, Safari, Firefox, Internet Explorer.

According to certain embodiments, all technical KPIs in a given list thereof, are collected for all pilots and startups, by default. Alternatively, each enterprise may select desired kpi's e.g. kpi-y's, e.g. from a list thereof provided by the system shown and described herein.

Given a specific kpi-y, any suitable scheme may be employed to determine which kpi-x's to use in a model to predict that kpi-y (or plural kpi-y's). For example, the enterprise may select same from a list and/or the system may suggest same. Technical KPIs may be combined into (e.g. plugged into) a computational formula which may be used to predict one or more given kpi-y's. Typically, all formulas are specific per pilot; the system may store same in association with the relevant pilot and may suggest that the same formulae be reused by the same enterprise in other pilots.

According to certain embodiments, once a neural network model has been generated and is to be used for KPI prediction, e.g. in a production environment, the model may be packaged in a serverless container using a suitable technology such as but not limited to AWS Lambda, Microsoft Azure Functions, Google Cloud Functions. Advantages of this embodiment include fast KPI prediction computation based on the serverless container-packaged models and ensuring that the models served by the system are up-to-date e.g. because each time a given model for a given start-up and/or pilot and/or enterprise is updated, regenerated or recreated, the updated/regenerated/recreated model may then be repackaged and redeployed into the container.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and may not be required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order, program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order, electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with, but be external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A computerized system for computerized computer software pilot evaluation, the system comprising:
   a computerized platform for computerized computer software pilot evaluation, comprising a processor and memory to perform:
   allowing a plurality of enterprise end-users to provide one or more defined pilots, wherein each defined pilot is defined for a specific task;
   allowing a plurality of startup end-users to apply to participate in a defined pilot for a specific task, wherein the startup end-users submit software programs that are able to perform the specific task of the defined pilot to which it is applied;
   generating a test environment for each defined pilot for the specific task, to be used by all start-ups that applied to participate in the defined pilot;
   defining a set of n measurable kpi's for each defined pilot;
   monitoring each software program submitted by said startup end-users that applied to said defined pilot by executing in its respective test environment, measuring values for each of said defined n measurable kpi's and aggregating said values for each startup end-users software program;
   selecting, for each startup end-users software program of a defined pilot, from their respective aggregated values, a set of training data and a set of test data and storing said sets of training data and test data for each software program submitted by a startup end-user that applied to participate in its respective defined pilot for a specific task;
   generating at least one neural network using said sets of training data and test data for each startup end-users software program and storing the generated neural network thereby to define a saved neural network;
   using said saved neural network to provide data to a simulator which supports the manipulation of the defined pilots kpi-x values by an enterprise end-user of startup end-users software program participating in the defined pilot, and which, responsive to said manipulation, presents the enterprise end-user with at least one kpi-y value predicted by said neural network for the startup end-users software program.

2. A system according to claim 1 wherein, once a neural network model has been generated for a given start-up and/or pilot and/or enterprise, the model is packaged in a serverless container and subsequently, KPI prediction computation for the given start-up and/or pilot and/or enterprise, is in accordance with the serverless container-packaged model and wherein each time said model is updated, regenerated or recreated, the model as updated, regenerated, or recreated is repackaged and redeployed into said container.

3. A method according to claim 1 wherein the neural network is operative for predicting, as a function of a set of n_s independent measurable kpi's which characterize each individual startup server s from among at least one startup server participating in said individual pilot, at least one dependent kpi, kpi-y, characterizing said individual startup server.

4. A method according to claim 3 wherein n_s=n, a single value which is uniform over plural startup servers s and wherein at least some neural network definition parameters are computed once and re-used each time at least one neural network is used to predict at least one derivable kpi from measurable kpi's generated by said plural startup servers.

5. A computerized computer software pilot evaluation method, the method comprising using a computerized platform for computerized computer software pilot evaluation, comprising a processor and memory to perform:
   allowing a plurality of enterprise end-users to provide one or more defined pilots, wherein each defined pilot is defined for a specific task;
   allowing a plurality of startup end-users to apply to participate in a defined pilot for a specific task, wherein the startup end-users submit software programs that are able to perform the specific task of the defined pilot to which it is applied;
   generating a test environment for each defined pilot for the specific task, to be used by all start-ups that applied to participate in the defined pilot;
   defining a set of n measurable kpi's for each defined pilot;
   monitoring each software program submitted by said startup end-users that applied to said defined pilot by executing in its respective test environment, measuring values for each of said defined n measurable kpi's and aggregating said values for each startup end-user's software program;
   selecting, for each startup end-users software program of a defined pilot, from their respective aggregated values, a set of training data and a set of test data and storing said sets of training data and test data for each software program submitted by a startup end-user that applied to participate in its respective defined pilot for a specific task;
   generating at least one neural network using said sets of training data and test data for each startup end-users software program and storing the generated neural network thereby to define a saved neural network; and
   using the saved neural network to provide data to a simulator which supports the manipulation of the defined pilots kpi-x values by an enterprise end-user of startup end-users software program participating in the defined pilot, and which, responsive to said manipulation, presents the enterprise end-user with at least one kpi-y value predicted by said neural network for the startup end-users software program.

6. A method according to claim 5 and also comprising defining a set of neural network definition parameters, and, accordingly, using a machine learning engine to generate, if possible, at least one neural network which fits each currently stored training set for each startup server and for each pilot.

7. A method according to claim 6 wherein an attempt to generate a neural network is made periodically for each startup server and for each pilot.

8. A method according to claim 5 wherein said simulator, responsive to said manipulation, displays the at least one kpi-y value predicted by said neural network for at least one startup server, on a computer screen in real time.

9. A method according to claim 5 wherein the neural network is operative for predicting, as a function of a set of n_s independent measurable kpi's which characterize each individual startup server s from among at least one startup server participating in said individual pilot, at least one dependent kpi, kpi-y, characterizing said individual startup server.

10. A method according to claim 2 wherein said generating comprises:
assigning values to neural network definition parameters;
saving said values for certain of said neural network definition parameters for re-use.

11. A method according to claim 9 wherein said set of n_s independent kpi's comprises exactly 2 independent kpi's, for at least some startup servers.

12. A method according to claim 9 wherein said measurable kpi's comprise at least one technical kpi including at least one of: an operating system KPI, and a KPI relevant to a specific channel type.

13. A method according to claim 9 wherein n_s=n, a single value which is uniform over plural startup servers s and wherein at least some neural network definition parameters are computed once and re-used each time at least one neural network is used to predict at least one derivable kpi from measurable kpi's generated by said plural startup servers.

14. A method according to claim 5 wherein for at least one startup server participating in at least one enterprise's computer software pilot, at least one dependent kpi comprises a parameter quantifying disc usage by said server, and said measurable kpi's comprise a first kpi comprising % cpu utilization by said server and a second kpi comprising a parameter quantifying memory usage by said server.

15. A method according to claim 13 wherein n_s=n, a single value which is uniform over all servers s and at least one pilot and wherein at least some neural network definition parameters are computed once and re-used each time at least one neural network is used to predict at least one derivable kpi from measurable kpi's generated by all startup servers within at least one enterprise's pilot.

16. A method according to claim 15 wherein a training set is defined for all startups and pilots thereby to define plural training sets and wherein data in each of said plural training sets is accumulated by sampling over a period of length H hours where H is uniform for all startups and pilots.

17. A method according to claim 15 wherein n_s=2, over all servers s and at least one pilot.

18. A method according to claim 15 wherein said at least one pilot comprises all pilots.

19. A computer program product, comprising a non-transitory tangible computer readable medium having computer readable program code embodied therein, said computer readable program code adapted to be executed to implement a computerized method for computerized computer software pilot evaluation, the method comprising using a computerized platform for computerized computer software pilot evaluation, comprising a processor and memory to perform:
allowing a plurality of enterprise end-users to provide one or more defined pilots, wherein each defined pilot is defined for a specific task;
allowing a plurality of startup end-users to apply to participate in a defined pilot for a specific task, wherein the startup end-users submit software programs that are able to perform the specific task of the defined pilot to which it is applied;
generating a test environment for each defined pilot for the specific task, to be used by all start-ups that applied to participate in the defined pilot;
defining a set of n measurable kpi's for each defined pilot;
monitoring each software program submitted by said startup end-users that applied to said defined pilot by executing in its respective test environment, measuring values for each of said defined n measurable kpi's and aggregating said values for each startup end-users software program;
selecting, for each startup end-users software program of a defined pilot, from their respective aggregated values, a set of training data and a set of test data and storing said sets of training data and test data for each software program submitted by a startup end-user that applied to participate in its respective defined pilot for a specific task;
generating at least one neural network using said sets of training data and test data for each startup end-users software program and storing the generated neural network thereby to define a saved neural network; and
using said saved neural network to provide data to a simulator which supports the manipulation of the defined pilots kpi-x values by an enterprise end-user of startup end-users software program participating in the defined pilot, and which, responsive to said manipulation, presents the enterprise end-user with at least one kpi-y value predicted by said neural network for the startup end-users software program.

* * * * *